United States Patent
Rohner

(10) Patent No.: US 9,978,548 B2
(45) Date of Patent: May 22, 2018

(54) LIQUID FILLED BELLOWS ACTIVATED SWITCH AND VOLTAGE SOURCE MADE THEREFROM, TIMEPIECES AND METHODS RELATED THERETO

(71) Applicant: Preciflex SA, Neuchâtel (CH)

(72) Inventor: Johann Rohner, Yverdon-les-Bains (CH)

(73) Assignee: Preciflex SA, Neuchâtel (\*) Notice: Subject to any disclaimer, the term of this patent is extended or adjusted under 35 U.S.C. 154(b) by 0 days. days.

(21) Appl. No.: 15/025,896

(22) PCT Filed: Oct. 3, 2014

(86) PCT No.: PCT/IB2014/002031
§ 371 (c)(1),
(2) Date: Mar. 30, 2016

(87) PCT Pub. No.: WO2015/049577
PCT Pub. Date: Apr. 9, 2015

(65) Prior Publication Data
US 2016/0217949 A1    Jul. 28, 2016
US 2017/0169971 A9    Jun. 15, 2017

Related U.S. Application Data

(60) Provisional application No. 61/886,112, filed on Oct. 3, 2013.

(51) Int. Cl.
*H01H 29/18* (2006.01)
*G04B 1/26* (2006.01)
(Continued)

(52) U.S. Cl.
CPC .............. *H01H 29/18* (2013.01); *G04B 1/26* (2013.01); *G04B 1/265* (2013.01); *G04B 19/30* (2013.01);
(Continued)

(58) Field of Classification Search
CPC ...... G04B 1/265; H01H 29/00; H01H 29/004; H01H 29/04; H01H 29/18
See application file for complete search history.

(56) References Cited

U.S. PATENT DOCUMENTS 3,249,724 A * 5/1966 Hurvitz ................. H01H 29/00
                                                                    200/181
3,330,928 A * 7/1967 Seablom ............... H01H 29/00
                                                                    200/210
(Continued)

FOREIGN PATENT DOCUMENTS

CN    1054133    8/1991
FR    1552838    1/1969
(Continued)

OTHER PUBLICATIONS

International Search Report, International patent application No. PCT/IB2014/002031, dated Apr. 9, 2015.
(Continued)

*Primary Examiner* — Amy Cohen Johnson
*Assistant Examiner* — Daniel Wicklund
(74) *Attorney, Agent, or Firm* — Da Vinci Partners LLC; John Moetteli

(57) ABSTRACT

The device 10 includes a liquid filled bellows activated battery composed of two non miscible fluids 14, 15 flowing through a channel 13 containing two electrodes 16, 17 of different metals. One of the fluids 14 is an electrolyte while the second 15 one is electrically non conducting. At rest the two electrodes 16, 17 are in the non conductive fluid 15. When the electrical device is actuated, manually or by an external force, the fluids surrounding the electrodes 16, 17 are replaced by the electrolyte 14 thus generating an electrical voltage between the two electrodes. The electrical current can be used to temporarily generate light or supply energy to another device. When the actuation mechanism is
(Continued)

released, the electrodes 16, 17 are surrounded by the non conductive fluids 15 again and the electrical current is stopped.

28 Claims, 4 Drawing Sheets

(51) Int. Cl.
  *H01H 29/00* (2006.01)
  *H01H 29/04* (2006.01)
  *H01M 6/38* (2006.01)
  *G04B 19/30* (2006.01)

(52) U.S. Cl.
  CPC .......... *H01H 29/00* (2013.01); *H01H 29/004* (2013.01); *H01H 29/04* (2013.01); *H01M 6/38* (2013.01); *H01M 2220/30* (2013.01)

(56) References Cited

U.S. PATENT DOCUMENTS

| | | |
|---|---|---|
| 3,701,868 A | 10/1972 | Lucian |
| 3,889,086 A | 6/1975 | Lucian |
| 3,906,415 A * | 9/1975 | Baker ............... H01H 29/00 200/214 |
| 3,983,350 A | 9/1976 | Camin |
| 4,036,827 A | 7/1977 | Rich |
| 4,172,251 A | 10/1979 | Faustini |
| 4,759,998 A * | 7/1988 | Robinson ............ H01M 10/42 429/104 |
| 7,164,090 B2 * | 1/2007 | Beerling ............ H01H 1/0036 200/182 |
| 2006/0208915 A1 * | 9/2006 | Oakner ............. H01H 29/00 340/620 |
| 2008/0150659 A1 * | 6/2008 | Yokoyama ......... H01H 29/00 335/49 |

FOREIGN PATENT DOCUMENTS

| | | | |
|---|---|---|---|
| GB | 462978 | 3/1937 | |
| GB | 494059 A * | 10/1938 | ............ H01H 29/00 |
| WO | WO 2013/084057 | 6/2013 | |

OTHER PUBLICATIONS

International Search Report, International patent application No. PCT/IB2015/000446, dated Nov. 13, 2015.

* cited by examiner

LIQUID FILLED BELLOWS ACTIVATED SWITCH AND VOLTAGE SOURCE MADE THEREFROM, TIMEPIECES AND METHODS RELATED THERETO

CROSS REFERENCE TO RELATED APPLICATIONS

This application is the National Stage of International Application No. PCT/IB2014/002031, filed Oct. 3, 2014, which claims benefit under 35 USC § 119(a), to U.S. provisional patent application Ser. No. 61/886,112, filed Oct. 3, 2013.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

This invention relates to electrical switches and small batteries for timepieces, and in particular for wrist watches.

Electrical switches in time pieces and wrist watches are often plagued with problems related to mechanical wear between components of the switch and often break or malfunction because of this wear.

Various types of switches are described in the literature, by way of example, U.S. Pat. No. 4,172,251, U.S. Pat. No. 4,036,827, GB462978A, CN1054133A, GB462978A, and CN1054133A. These devices have the drawback of being very large, and many include toxic substances such as mercury therein.

Batteries are often associated with low cost products and therefore are not suited for luxury items.

What is needed is a reliable electrical switch. What is needed is a battery that has an innovative appeal so as to be suitable for a luxury product. What is needed is a combined switch and battery that fulfills both the above-mentioned needs.

SUMMARY OF THE INVENTION

An electrical device is provided which functions as a switch, and, in combination, as a battery. The device is made up of a tubular housing and flexible end structures which close the tubular housing. The tubular housing has two electrodes of different metallic conductors and contains non miscible fluids and a meniscus therebetween. One of the fluids is conductive and the other of the fluids is non-conductive. A user is provided with means for displacing the meniscus across the electrodes to open or close a current path therebetween. Optionally, the conductive fluid is an electrolyte, such that when the electrolyte is in contact with both electrodes, the switch functions as a battery.

An object of the invention is it to provide a reliable electrical switch.

An alternate object of the invention is to provide a voltage source that has an innovative appeal so as to be at home in a luxury product.

Another object of the invention is to provide a combined switch and battery that fulfills both the above-mentioned needs.

In another variant, the invention provides a timepiece comprising the electrical device described herein.

In yet another aspect, the invention provides a method of operating at least a portion of a timepiece that includes displacing a meniscus across electrodes to open or close a current path therebetween.

In yet another embodiment, the method further comprises providing in the wrist watch battery functionality through the displacement of the meniscus across the at least two electrodes.

In yet another aspect, the method further comprises disposing the meniscus on the wrist watch such that the meniscus is visible to the user, and in which the meniscus provides battery functionality, while simultaneously providing an interesting visual effect.

In yet a further aspect, the method of operating a timepiece includes an electrical device. The electrical device includes a tubular housing and flexible end structures which close the tubular housing. The tubular housing has two electrodes and contains non miscible fluids and the meniscus therebetween. One of the fluids is conductive and the other of the fluids is non-conductive.

In yet another variant, the invention provides a wrist watch including mechanical components which enable a means of operating all portions of the wrist watch mechanically and fluidically, and wherein for optical effect, an electrically driven illuminator of a watch dial in also provided. The optical electrically driven illuminator of the watch dial is electrically energized by a sub-system of the mechanical components that displaces a meniscus across electrodes to provide battery functionality.

In yet a further variant, the wrist watch further includes a watch housing. At least a portion of the sub-system and the meniscus are directly visible to the user through the watch housing. In this way, the meniscus further simultaneously provides visual indicator functionality directly visible to the user.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as they are exemplary in nature, serving to describe the best mode of the invention known the inventors as of the filing date hereof. Consequently, changes may be made in the arrangement and/or function of any of the elements described in the exemplary embodiments disclosed herein without departing from the spirit and scope of the invention.

Figure 1A:
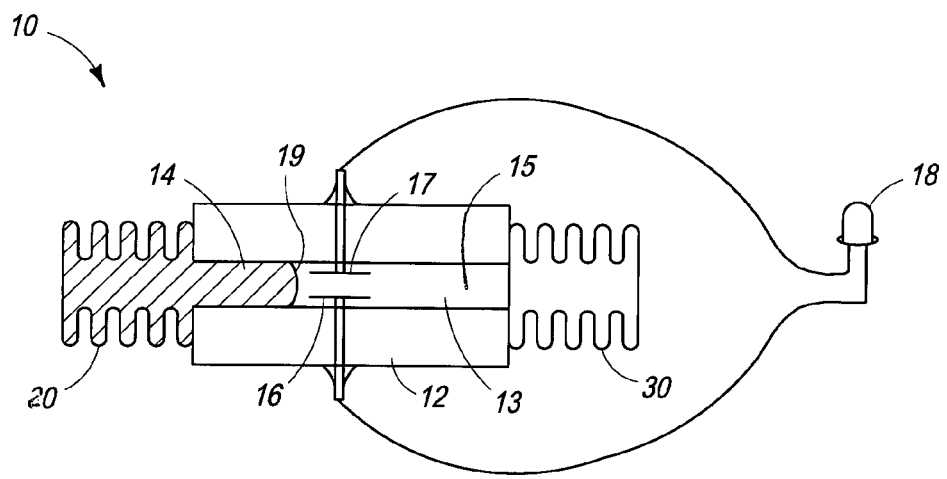
FIG. 1A is a side, cross-sectional view of an electrical device of the invention, in an open configuration.
Figure 1B:
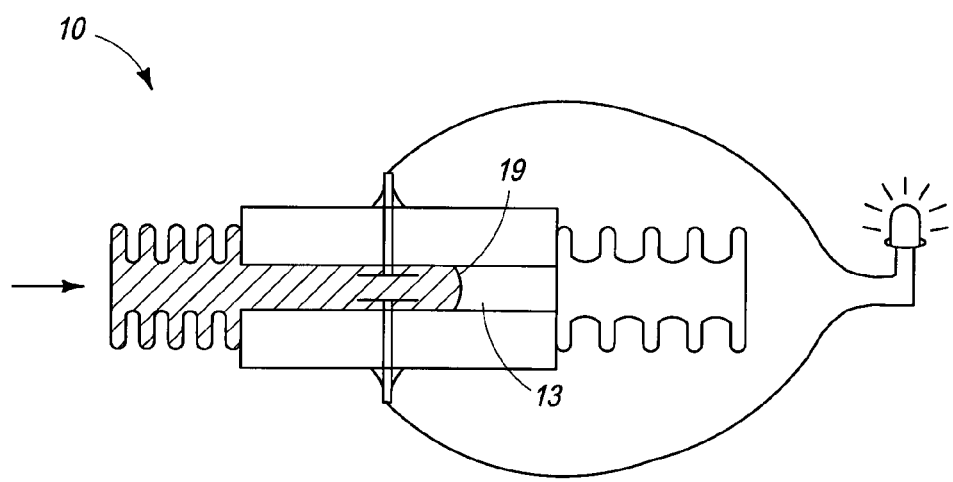
FIG. 1B is a side, cross-sectional view of the electrical device of the invention, in a closed configuration.

Referring now to FIGS. 1A and 1B, an electrical device 10 is provided which functions as a switch, and, optionally, as a battery. The electrical device 10 functions independently as a switch in one variant. In another variant, the electrical device 10 functions as a battery/switch combination. In yet a further variant, the electrical device 10 functions as a combination switch and battery. It is appreciate that a system is also described with one or more (e.g. a plurality of) electrical devices 10 provided. As such, a plurality of independent switches are provided in the system, as well as a plurality of independent batteries, which can optionally function in an electrical circuit, and be used to actuate one or more other devices or portions of a timepiece.

The device 10 is made up of a tubular housing 12 (one or more housings are also used herein), made of insulating material, and flexible end structures 20 and 30 which close the one or more tubular housing(s). The tubular housing 12 defines a substantially unobstructed capillary channel and has two electrodes 16 and 17 (although the invention, in one variant, may use a plurality of electrode pairs) and contains non miscible fluids 14 and 15 (in another variant of the invention, several sets of non-miscible fluid pairs are used) and a meniscus 19 therebetween (optionally, where several sets of non-miscible fluid pairs are used, a plurality of menisci are provided). One of the fluids (or of the optional fluid pair) is a conductive fluid 20 (e.g., mercury, or an ionic fluid) and the other of the fluids (or of the optional fluid pair) is a non-conductive, non-ionic fluid 30 (and can be, optionally, one or more gases, in another variant of the invention). In another variant, the invention uses fluids which are non-toxic, and/or non-mercury containing. A user is provided with means for displacing the meniscus 19 (or multiple optional menisci) across the electrodes 16 and 17 (or the optional electrode pairs) to open or close a current path therebetween. Optionally, the two electrodes are made out of metals or metallic conductors different in composition from the electrolyte, such that when the electrolyte is in contact with both electrodes, the switch functions as a battery. Various electrode and electrolyte compositions are used herein, and in the system described above, combinations of different electrolyte compositions and electrode pairs are used to provide varying switch capability within the system.

In one embodiment, the flexible end structures are bellows 20 and 30. In another variant a plurality of bellows pairs are used in the system of the invention, each providing different functionality to various sub-systems within the system, e.g. including switching capability and energy generation capability. Various types of bellows are used in the invention, and in one variant, the bellows 20 and 30 are sized, constructed and dimensioned as accordion shaped structures. These structures have the benefit of moving the fluids through a sufficient distance to enable the functionality of the entire system efficiently in a very compact configuration. The bellows 20 and 30 are actuated to move the meniscus 19 to one or the other side of the electrodes. In a variant, a plurality of menisci are moved through an essentially unobstructed, single channel across various set of electrode pairs. In another variant, a plurality of menisci are moved through a plurality of channels in the system. In yet another variant, a single sub-system includes a single meniscus and movement of the meniscus within a single channel, alone or in combination, with another sub-system that includes a plurality of menisci moving through a single channel as described herein. Hence, various structural configurations of the system support these variants, as well as various methods of the invention described herein, e.g. include methods of energy generation and/or methods of switching, alone or in combination using one or more of the sub-systems described herein.

In one embodiment, the bellows 20, 30 are made of a metal or a metallic material, such as, by way of example, nickel or Nitinol®, which enhances the perception of quality of the device 10 and functionality of device 10. Nickel Titanium (NiTi) is in the class of shape memory alloys which may be used in the present invention. A thermoelastic martensitic phase transformation in the material is responsible for its extraordinary properties. Nitinol™ properties include the shape memory effect, superelasticity, and high damping capability. These technical properties of NiTi shape memory alloys can be modified to a great extent by changes in composition, mechanical working, and heat treatment to obtain different properties of the bellows described herein. Shape memory is a property of select materials that have the ability to "remember" the shape given during original thermo-mechanical processing allowing the material to revert to that original shape when subjected to heat. Other memory shape alloys used in the invention include copper-zinc-aluminum-nickel and copper-aluminum nickel. Materials with shape memory properties allow for the creation of lightweight solid-state devices that would otherwise require the use of mechanical systems.

However, the bellows 20, 30, of course, is constructed of any suitable flexible and water tight material such as a polymer or polymer composition, a rubber or other elastic material. It is appreciated that when the system of the present invention is used in a wrist watch, the various components are sized and dimensioned to be accommodated within a very compact space.

In one embodiment, the tubular housing 12 is a capillary tube. One or more tubular housings are provided in various sub-systems of the invention. The capillary tube 12 has a microfluidic or capillary channel 13, through which the fluids may be actuated. As is appreciated, that the variants of the systems and sub-systems of the present invention include a plurality of independent capillary channels.

In an alternate embodiment, the meniscus 19 between the fluids is actuated by a flexible end structure in the form of a membrane. Of course, in each respective sub-system, a respective membrane is utilized, and a plurality of membranes reside in a plurality of similar sub-systems of the system described herein.

In the variant of the invention that functions as a battery (of course one or more sub-systems are also contemplated to provide a plurality of battery, e.g. power source capability variants), the electrodes 16 and 17 are made of a zinc material and a copper material, respectively, e.g. a zinc alloy and a copper alloy, and/or a zinc containing conductive polymer composition and a copper containing conductive polymer composition. The electrodes 16, 17 extend into the channel 13. Alternatively, the electrodes 16, 17 are in a chamber (not shown) larger than the channel 13. Of course, various metal and metal derivative and electrolyte compositions, and combinations thereof, may be used in various sub-systems of the present invention.

The device 10 may be actuated manually by a user or automatically actuated by one or more other sub-systems or systems utilized in the present invention. However, alternatively, an external mechanism, such as a mechanical timer or a plunger (not shown) against which a user can compress a bellows which is elastic enough so as to spring back to a rest position (in the battery embodiment, with the switch open i.e., the non-conductive fluid surrounding at least one electrode and therefore electrically isolating it from the other electrode).

In one variant, the device 10 is used to power an LED 18 (of course, a plurality of LEDs is also energized in other variants of the invention) to generate light to a watch face or to illuminate a florescent fluid filled display. Alternatively, the electrical power generated is used to actuate an external circuit or to supply an external device, alone or in combination with, the LED effects on the watch. One or more LEDS are used in the system of the invention, powered and switched by one or more sub-systems of the invention.

Figure 2:
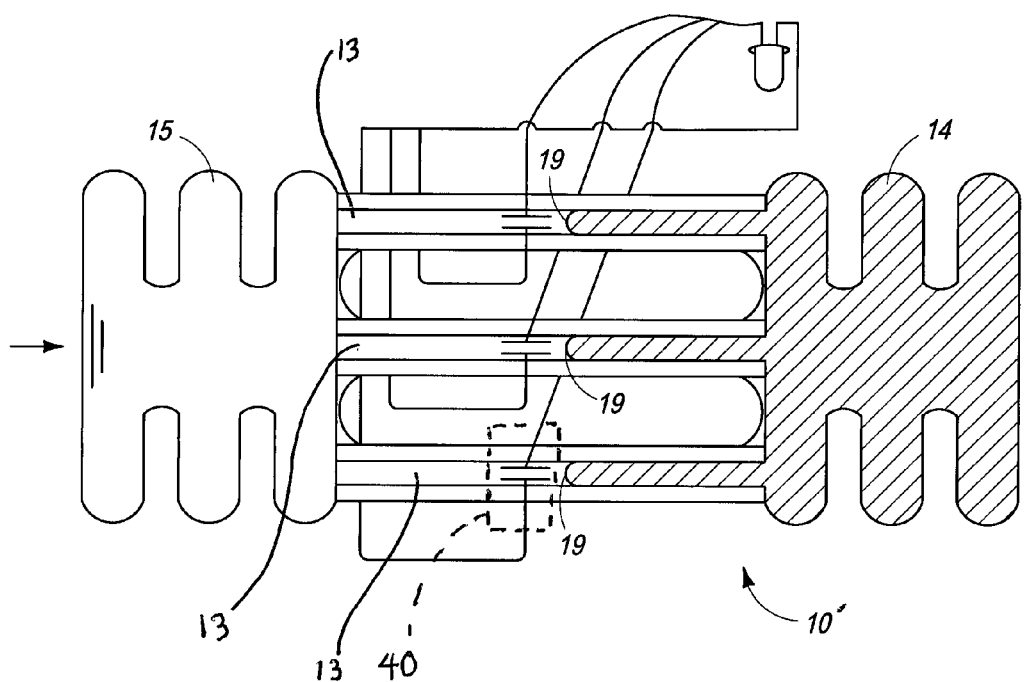
FIG. 2 is a side, cross-sectional view of an alternate embodiment of the electrical device of the invention.

Referring in particular to FIG. 2, in another variant, the device includes several pairs 40 of electrodes in parallel. In this embodiment, capillary channels 13 are provided that include several separate channels (which assume locations within the system parallel to one another, or in stacked arrangements, or across the interior of a timepiece in a variety of geometric arrangements, e.g. parallel, crossed arrangements, etc.) which connect two distal reservoirs (of course, a plurality of reservoir pairs are also used in a variant of the invention). In one variant, at least two of the separate channels has a pair of electrodes. Of course a multiplicity of channels are also provided in a variant of the invention with a multiplicity of electrode pairs.

Figure 3:
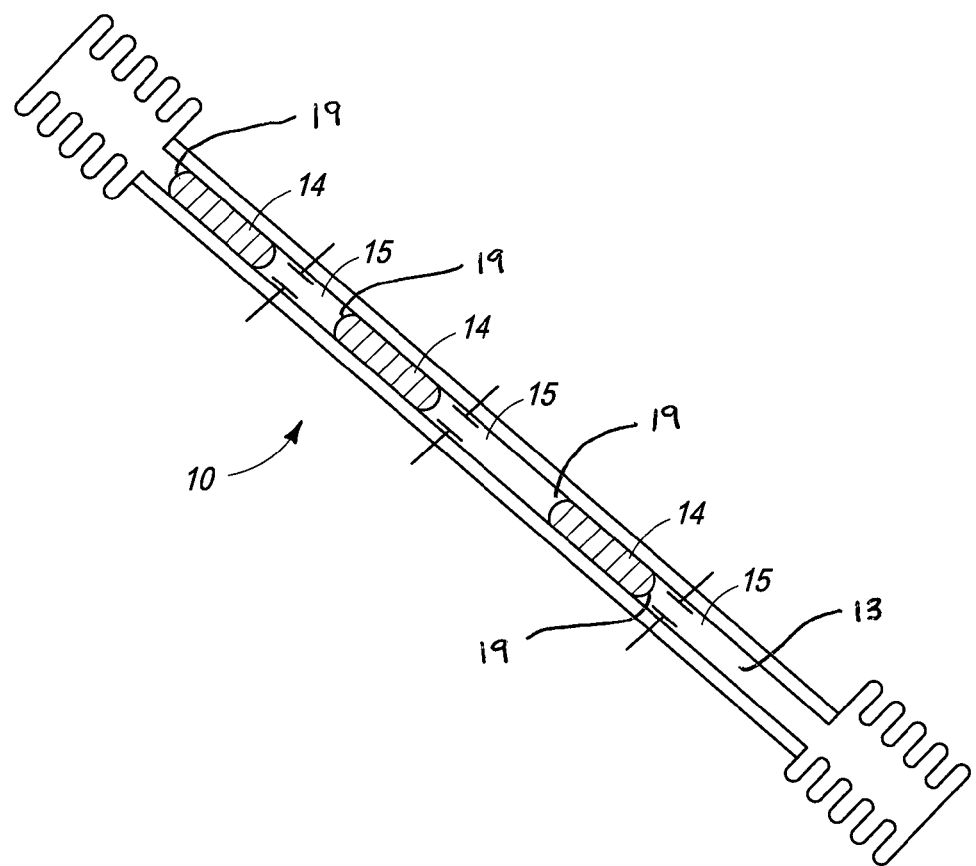
FIG. 3 is a side, cross-sectional view of yet another embodiment of the electrical device of the invention.

Referring in particular to FIG. 3, in one embodiment, the device 10 of the invention includes several pairs of electrodes in series in a single sub-system. In such an embodiment, the tubular channel 13 is filled with successive portions of the two fluids alternatively, thus having several menisci 19. Of course, in another variant, a plurality of sub-systems of FIG. 3, alone or in combination, with the other sub-systems described herein are also provided providing increased functionality of the entire system.

Figure 4:
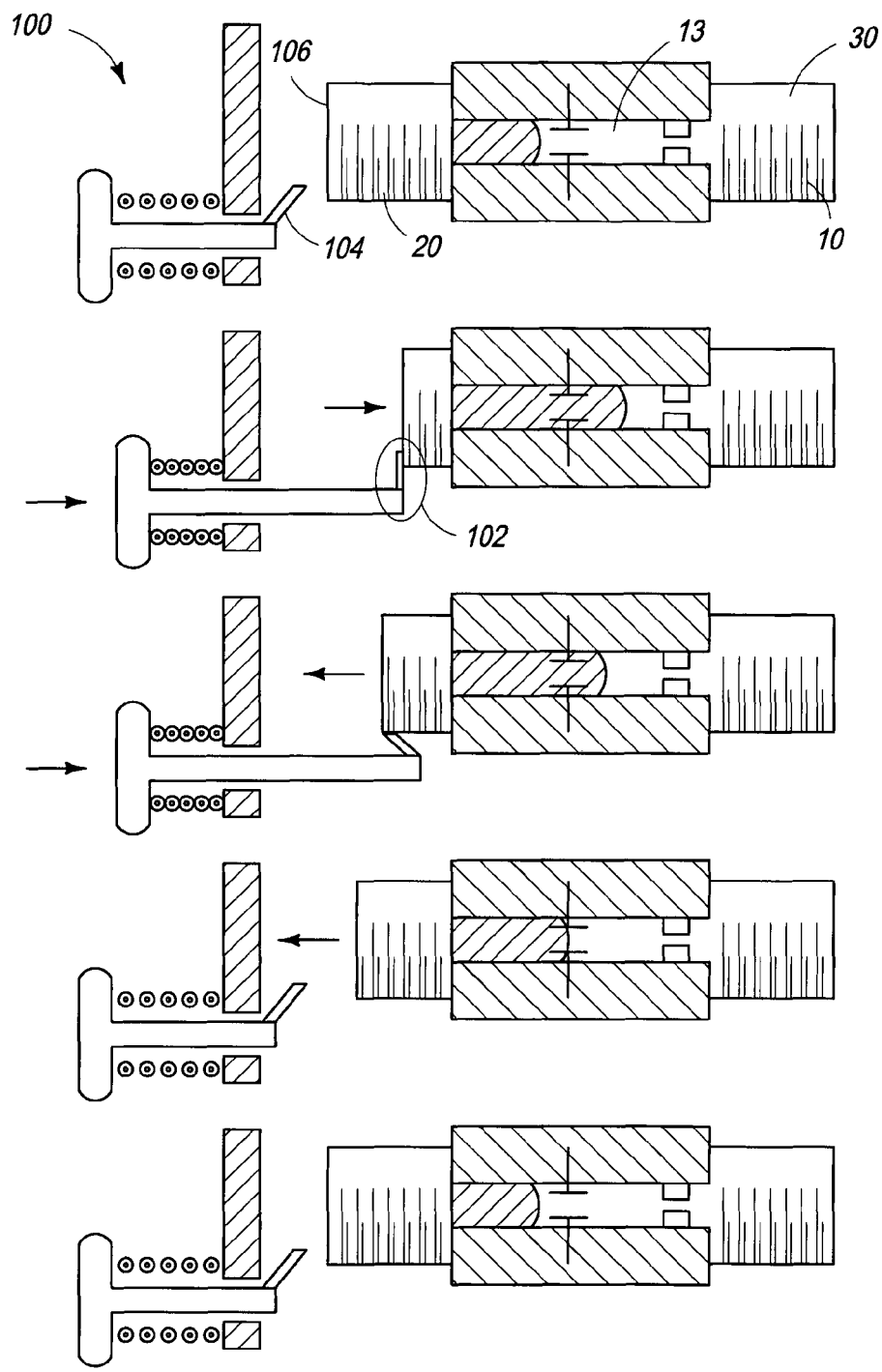
FIG. 4 are progressive views of the actuation of a bi-stable plunger for activating the electrical device of the invention.

Referring now to FIG. 4, progressive views of the actuation of a bi-stable plunger 100 are shown. As can be seen from this progression, the plunger 100 presses against a bellows 20 or 30, thereby compressing it. Once a user releases the plunger 100, the duration of the activation is then driven by the spring rate of the bellows 20 or 30 limited by a fluidic resistance of fluid flow through the channel 13. To prevent the user from continuing to press the plunger 100 and so continuing to activate the switch 10, 10', or 10", a bi-stable mechanism 102 (see the offset plunger 100 having a bi-stable cantilever arm 104 which acts against the bellows 20 or 30, and then breaks over to free the end 106 of the bellows) is added that frees the end of the bellows 20, 30 thereby allowing it to return, even though the user's finger continues to press the plunger 100.

In one embodiment, the flexible end structures are made at least in part of glass. The tubular housing may be transparent or non-transparent, and be constructed of a fully transparent material or a partially transparent material, or of a partially non-transparent or fully non-transparent material depending on the desired functionality of this component of the system or sub-system. In an advantage, the invention provides a reliable electrical switch. In another advantage, the invention provides a battery that has an innovative appeal so as to be suitable for a luxury product. In another advantage, the invention provides a combined switch and battery that fulfills both the above-mentioned needs, simultaneously, intermittently or as controlled by circuitry.

As is appreciated, the invention provides a timepiece comprising the electrical device described herein, and a method of operating at least a portion of the timepiece that includes displacing a meniscus across electrodes to open or close a current path therebetween. The method of operating a timepiece includes an electrical device. The electrical device includes a tubular housing and flexible end structures which close the tubular housing. The tubular housing has two electrodes and contains non miscible fluids and the meniscus therebetween. One of the fluids is conductive and the other of the fluids is non-conductive.

Other features are also used, in combination, with the invention described herein.

By way of example, a visual indicator display device is used in combination with the invention and includes a bracelet, a transparent capillary chamber, and a displacement member. The transparent capillary chamber is matched to an indicia and has a primary length and a width less than the primary length. An analog indicator of the invention indicates time.

By way of further example, the features of the invention are incorporated into a wristwatch. The watch advantageously comprises a case in a distributor with a two fluid reservoir and a pump.

The watch movement comprises a power source, for example a cylinder or a stack, a regulating member, for example a rocker assembly/spiral or a crystal oscillator, a pump, as well as transmission elements, including for example a train of gears and pinions. Other elements, including complications etc. can be provided. The power source can also activate the pump.

The pump causes the liquid from the tank in channels through the glass shows to display temporal information or other information through the watch glass. The channels typically have portions parallel to the display surface of the ice, as well as holes perpendicular to this surface and to connect the pump to the dispenser and in motion.

The geometry and dimensions of the channels in the glass and in the rest of the watch are chosen so as to allow filling without bubbles when the bubbles are undesirable. For this purpose, the narrowest crosssections of the channels are of one square millimeter, for example between 0.1 and 10 square millimeters, which allows to discharge the bubble with acceptable overpressure in the system, for example of only a few millibars overpressure. It also avoids preferably too abrupt changes in direction, such as angles, and complex or too thin geometries which can cause obstructions bubbles in narrow passages and block the flow of fluid.

The liquid (or other fluid) is preferably colored for better visibility in the channels. Clear fluids may also be used, however, they should change the refraction on the inner surface of the channels in order to make them visible when full. Liquid flows through these channels modifies the opacity and/or color of the glass in the channels where liquid is found. It is also possible to use phosphorescent liquid visible at night, for example, liquids with phosphorescent or luminescent particles.

The path followed by the fluid depends on the viscosity of the fluid of the inner walls of the canal and the pressure applied by the pump. It is thus possible to control the path traveled by and/or the flow velocity of a bubble or a drop in the working channel on the choice of surface tensions of the liquids and the wettability properties and characteristics hydrophilic or hydrophobic surfaces of the channels, and on the shape and surface condition. Preferably, no active microvalve is used in the liquid circuit.

Further, the invention should be considered as comprising all possible combinations of every feature described in the instant specification, appended claims, and/or drawing figures which may be considered new, inventive and industrially applicable.

It should be appreciated that the particular implementations shown and herein described are representative of the invention and its best mode and are not intended to limit the scope of the present invention in any way.

As will be appreciated by skilled artisans, the present invention may be embodied as a system, a device, or a method.

The present invention is described herein with reference to block diagrams, devices, components, and modules, according to various aspects of the invention. It will be understood that each functional block of the blocks diagrams, and combinations of functional blocks in the block diagrams, can be implemented by computer program instructions which may be loaded onto a general purpose computer, special purpose computer, or other programmable data processing apparatus to produce a machine, such that the instructions which execute on the computer or other programmable data processing apparatus create enable the functionality specified in the block diagrams.

Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Copyright may be owned by the Applicant(s) or their assignee and, with respect to express Licensees to third parties of the rights defined in one or more claims herein, no implied license is granted herein to use the invention as defined in the remaining claims. Further, vis-à-vis the public or third parties, no express or implied license is granted to prepare derivative works based on this patent specification, inclusive of the appendix hereto and any computer program comprised therein.

Additional features and functionality of the invention are described in the claims appended hereto. Such claims are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

What is claimed is:

1. An electrical device made up of a tubular housing and flexible end structures which hermetically close the tubular housing, the tubular housing having at least two electrodes and containing non miscible fluids therein, and the tubular housing forming a fluid conduction pathway for the non miscible fluids; and, a meniscus between the non miscible fluids in the tubular housing, one of the fluids being a conductive fluid, and the other of the fluids being a non-conductive fluid, wherein a mechanical activation of a flexible end structure causes a displacement of the meniscus across the electrodes and opens or closes a current pathway therebetween wherein the at least two electrodes are constructed of different metallic conductors, such that when an electrolyte is in contact with both electrodes, the device functions as a battery power source.

2. The electrical device of claim 1 wherein the flexible end structures comprise at least two bellows.

3. The electrical device of claim 2, wherein the at least two bellows are actuated to move the meniscus to one or the other side of at least one of the electrodes.

4. The electrical device of claim 2, wherein the bellows are constructed of a metal or metallic, flexible material.

5. The electrical device of claim 2, wherein the bellows comprise at least one polymer.

6. The electrical device of claim 1, wherein the tubular housing comprises at least one capillary tube, and in which the capillary tube is, optionally, substantially circular in cross-section.

7. The electrical device of claim 1, wherein the meniscus between the fluids is actuated by at least one flexible end structure.

8. The electrical device of claim 1, wherein the electrodes comprise a zinc material and a copper material respectively.

9. The electrical device of claim 1, further comprising a capillary channel, wherein the fluids are provided and wherein the fluids move through the capillary channel.

10. The electrical device of claim 1 further comprising a channel, and wherein the electrodes extend into the channel.

11. The electrical device of claim 10 further comprising a chamber, wherein the electrodes are in the chamber, the chamber being sized and dimensioned to be larger than a distance between adjacent ends of the respective electrodes.

12. The electrical device of claim 1 further comprising a manual actuator, and wherein the device is actuated manually via at least one flexible end structure.

13. The electrical device of claim 1 further comprising circuitry, and wherein the device generates electrical energy which is used to generate light in combination with the circuitry.

14. The electrical device of claim 1 further comprising an external circuit, and wherein electrical energy generated by the device is used to actuate the external circuit.

15. A system comprising the electrical device of claim 1, the system including an external device separate from the electrical device of claim 1, wherein electrical energy is generated via the electrical device, and wherein the electrical energy is used to supply energy to the external device.

16. The electrical device of claim 1, further comprising at least two pairs of electrodes in series.

17. The electrical device of claim 1, further comprising at least two pairs of electrodes in parallel.

18. The electrical device of claim 1, wherein the flexible end structures are made at least in part of a glass.

19. The electrical device of claim 1, wherein the tubular housing is constructed, at least in part, of a-transparent material.

20. The electrical device of claim 1, wherein the tubular housing is constructed, at least in part, of a non-transparent material.

21. A timepiece comprising at least the electrical device of claim 1, and visual indicators related to the keeping of time.

22. The electrical device of claim 1, wherein a resulting electrolytic reaction occurs during a duration of time.

23. The electrical device of claim 22, wherein the duration of time of the electrolytic reaction is driven by a fluidic resistance.

24. A method of operating at least a portion of a timepiece comprising: providing a timepiece housing, and using a flexible end structure mechanically displacing a meniscus formed between two non miscible fluids across at least two electrodes extending into a reservoir containing the fluid to open or close a current path between the at least two electrodes within the timepiece housing, further comprising: providing wrist watch battery functionality through the displacement of the meniscus across the at least two electrodes.

25. A method of operating at least a portion of a timepiece comprising: providing a timepiece housing, and using a flexible end structure mechanically displacing a meniscus formed between two non miscible fluids across at least two electrodes extending into a reservoir containing the fluid to open or close a current path between the at least two electrodes within the timepiece housing, further comprising: disposing the meniscus in the tubular housing such that the meniscus is visible to the user, and in which the meniscus provides battery functionality, while simultaneously providing visual effect directly visible by the user.

26. A method of operating at least a portion of a timepiece comprising: providing a timepiece housing, and using a flexible end structure mechanically displacing a meniscus formed between two non miscible fluids across at least two electrodes extending into a reservoir containing the fluid to open or close a current path between the at least two electrodes within the timepiece housing, in which the timepiece further comprises battery components, the battery components including a tubular housing, the tubular housing providing an unobstructed fluid conduction pathway for at least two non miscible fluids, the tubular housing having flexible end structures which close the tubular housing, the tubular housing having at least two electrodes and containing the at least two non miscible fluids and the meniscus therebetween, one of the fluids being conductive and the other of the fluids being non-conductive.

27. A wrist watch having mechanical components comprising a subsystem including a reservoir containing two immiscible fluids, the components enabling a method of operating the wrist watch mechanically and fluidically, wherein for illumination, the wrist watch has an electrically driven watch dial illuminator, the illuminator being electrically energized by the said sub-system of the mechanical components that mechanically displaces a meniscus in the reservoir across electrodes to provide battery functionality.

28. The wrist watch of claim 27 further comprising a watch housing, and in which at least a portion of the sub-system, and the meniscus are directly visible to the user through the watch housing, in which the meniscus and its movement is directly visible to the user.

* * * * *